(12) United States Patent
Kurahashi

(10) Patent No.: US 9,444,950 B2
(45) Date of Patent: Sep. 13, 2016

(54) IMAGE READING DEVICE AND IMAGE FORMING APPARATUS WITH WHITE REFERENCE OPTICAL ADJUSTMENT PORTIONS

(71) Applicant: KYOCERA Document Solutions Inc., Osaka (JP)

(72) Inventor: Taro Kurahashi, Osaka (JP)

(73) Assignee: KYOCRA Document Solutions Inc., Osaka (JP)

( * ) Notice: Subject to any disclaimer, the term of this patent is extended or adjusted under 35 U.S.C. 154(b) by 0 days.

(21) Appl. No.: 14/825,838

(22) Filed: Aug. 13, 2015

(65) Prior Publication Data

US 2016/0065754 A1    Mar. 3, 2016

(30) Foreign Application Priority Data

Aug. 27, 2014    (JP) .................................. 2014-172908

(51) Int. Cl.
*H04N 1/00* (2006.01)
*H04N 1/10* (2006.01)
*H04N 1/036* (2006.01)
*H04N 1/407* (2006.01)
*H04N 1/401* (2006.01)

(52) U.S. Cl.
CPC ........ *H04N 1/00082* (2013.01); *H04N 1/0005* (2013.01); *H04N 1/00013* (2013.01); *H04N 1/00045* (2013.01); *H04N 1/00055* (2013.01); *H04N 1/00063* (2013.01); *H04N 1/00551* (2013.01); *H04N 1/00708* (2013.01); *H04N 1/036* (2013.01); *H04N 1/1039* (2013.01); *H04N 1/1065* (2013.01); *H04N 1/401* (2013.01); *H04N 1/4015* (2013.01); *H04N 1/4076* (2013.01); *H04N 2201/0005* (2013.01); *H04N 2201/0081* (2013.01); *H04N 2201/0432* (2013.01)

(58) Field of Classification Search
USPC ......... 358/1.2, 2.1, 504, 505, 514, 449, 481, 358/406
See application file for complete search history.

(56) References Cited

U.S. PATENT DOCUMENTS

| | | | | |
|---|---|---|---|---|
| 2009/0207450 | A1* | 8/2009 | Nagamochi | ........ G01D 5/34746 358/2.1 |
| 2010/0157380 | A1* | 6/2010 | Miyagawa | ......... H04N 1/00002 358/448 |

FOREIGN PATENT DOCUMENTS

JP       2013-118579 A      6/2013

* cited by examiner

*Primary Examiner* — Marcellus Augustin
(74) *Attorney, Agent, or Firm* — Studebaker & Brackett PC

(57) ABSTRACT

A white reference plate includes in addition to a rectangular portion disposed at an optical adjustment position, white reference portions between an optical adjustment position and a document size detection position outside a document reading region (i.e., outside contact glass) in a main scanning direction. In response to an opening and closing detecting section detecting opening and closing of a document conveyance unit during optical adjustment, a drive section moves a scanning section from the optical adjustment position to the document size detection position. The white reference portions are disposed at locations above respective opposite end parts of the scanning section in a main scanning direction, so that optical adjustment can be performed using an output value that the scanning section obtains by reading the white reference portions without interruption even during or after the movement.

17 Claims, 7 Drawing Sheets

IMAGE READING DEVICE AND IMAGE FORMING APPARATUS WITH WHITE REFERENCE OPTICAL ADJUSTMENT PORTIONS

INCORPORATION BY REFERENCE

The present application claims priority under 35 U.S.C. §119 to Japanese Patent Application No. 2014-172908, filed on Aug. 27, 2014. The contents of this application are incorporated herein by reference in their entirety.

BACKGROUND

The present disclosure relates to an image reading device that reads an image of an original document and an image forming apparatus.

In image reading devices, when an original document is placed on contact glass and a document pressing plate is closed, a document size detector detects the size of the original document. Upon power-up or recovery from a sleep state of such an image reading device, shading correction through gain adjustment or offset adjustment of an image sensor is performed for preparing image reading. In a certain image reading device, when an original document is set and the document pressing plate is closed during gain adjustment or offset adjustment, the currently performed gain adjustment or offset adjustment is suspended and document size detection is performed.

SUMMARY

An image reading device according to one aspect of the present disclosure includes:

contact glass configured to receive placement of an original document;

a casing that accommodates the contact glass;

a scanning section accommodated in the casing and including a scanning unit including a plurality of light sources in a row in a main scanning direction that has a length greater than a length of the contact glass in the main scanning direction, the scanning section being configured to read an image of a part at a location opposite to the light sources in the main scanning direction, the image including an image of a part of an original document placed on the contact glass;

a drive section configured to move the scanning unit in a sub-scanning direction perpendicular to the main scanning direction;

a document pressing plate configured to be capable of opening and closing relative to the contact glass and press the original document placed on the contact glass against the contact glass when close;

an opening and closing detecting section configured to detect opening and closing of the document pressing plate;

a first white reference plate disposed at a location that is outside a document reading region in the sub-scanning direction and that is readable when the scanner unit is positioned at a first position adjacent to a document reading start position, the first white reference plate having a length in the main scanning direction equal to or greater than a length of the row of the light sources in the main scanning direction, the document reading region being a region in the contact glass across which the scanning unit performs reading;

a second white reference plate disposed at a location that is readable when the scanner unit is positioned at a second position and where reading of the original document placed on the contact glass is not obstructed in the main scanning direction, the second position being a position that is within the document reading region in the sub-scanning direction and where the scanning unit is positioned in detection of a size of the original document placed on the contact glass;

an optical adjustment section configured to perform optical adjustment on the scanning section using an output value that the scanning section obtains by reading the first white reference plate; and a control section that is configured to cause the scanning section to read the first white reference plate when the scanning unit is positioned at the first position for optical adjustment by the optical adjustment section, and cause the scanning unit to move from the first position to the second position for detection of a size of the original document in response to the opening and closing detecting section detecting opening and closing of the document pressing plate in the optical adjustment or reading.

In a state in which the scanning unit is positioned at the first position, the optical adjustment section performs optical adjustment using an image of the first white reference plate that the scanning section reads while in the state. After the scanning unit is moved to the second position, the optical adjustment section performs optical adjustment using an image of the second white reference plate that the scanning section reads in a state in which the scanning section is positioned at the second position.

DETAILED DESCRIPTION

An image reading device and an image forming apparatus according to embodiments of the present disclosure will be described below with reference to accompanying drawings. Note that an image reading device will be described as an example in the present embodiment for the sake of simple description. The image forming apparatus in the present disclosure is a combination of the image reading device described below and, for example, an electrographic or inkjet image forming apparatus.

Figure 1:
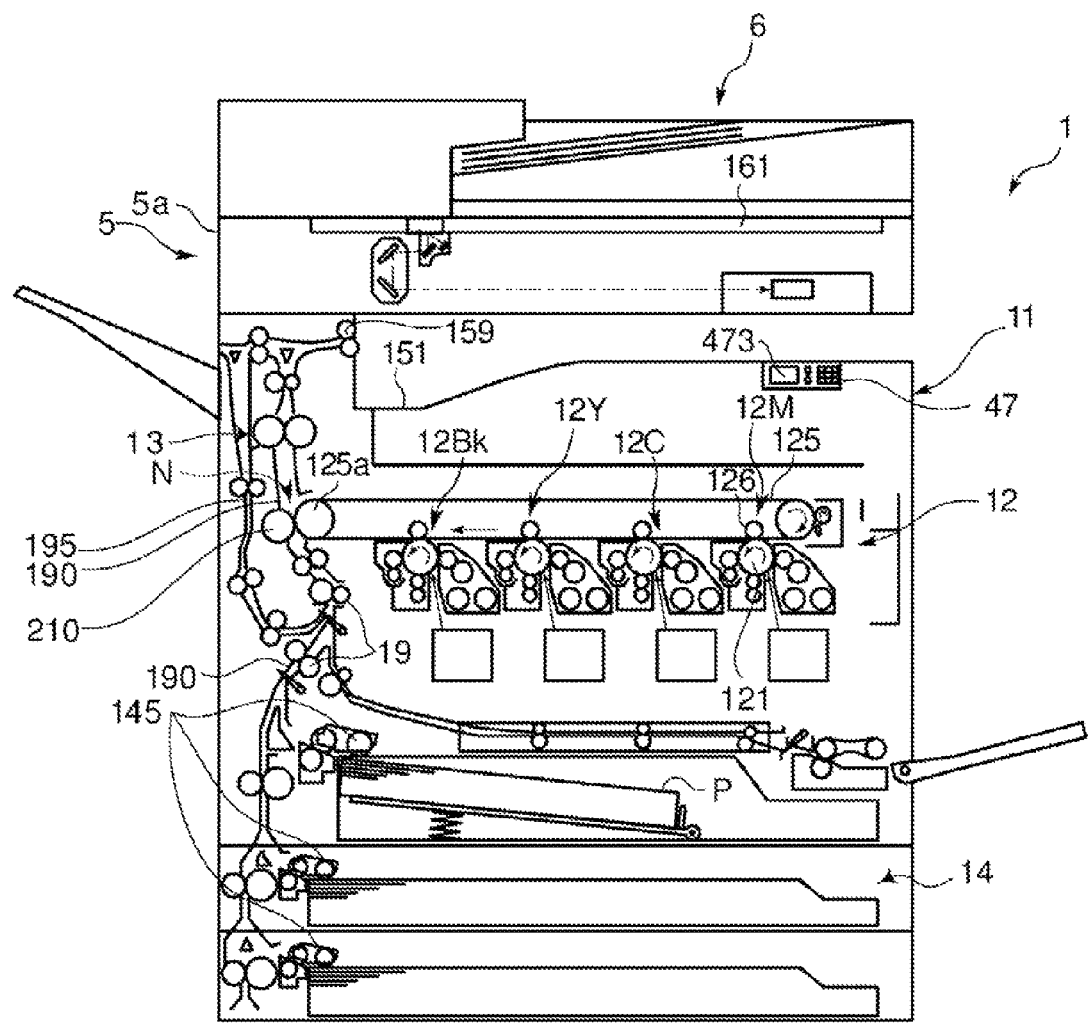
FIG. 1 is a front cross sectional view illustrating a configuration of an image forming apparatus including an image reading device according to an embodiment of the present disclosure.

FIG. 1 is a front cross sectional view illustrating a configuration of an image forming apparatus including an image reading device according to an embodiment of the present disclosure. An image forming apparatus 1 in an embodiment of the present disclosure is a multifunction peripheral having a plurality of functions including, for example, a copy function, a printing function, a scanning function, and a faxing function. The image forming apparatus 1 includes in the interior of a main body 11 thereof, an operation section 47, an image forming section 12, a fixing section 13, a paper feed section 14, a document conveyance section 6, an image reading section 5 as the image reading device, etc.

In document reading by the image forming apparatus 1, the image reading section 5 optically reads an image of an original document fed from the document conveyance section 6 or an original document placed on contact glass 161 to generate image data. The image data generated by the image reading section 5 is stored in, for example, an internal HDD or a computer connected via a network.

In image formation by the image forming apparatus 1, the image forming section 12 forms a toner image on a recording paper P as a recording medium fed from the paper feed section 14 based on, for example, the image data generated through the aforementioned document reading, image data received from the computer connected via the network, or image data stored in the internal HDD.

Figure 2:
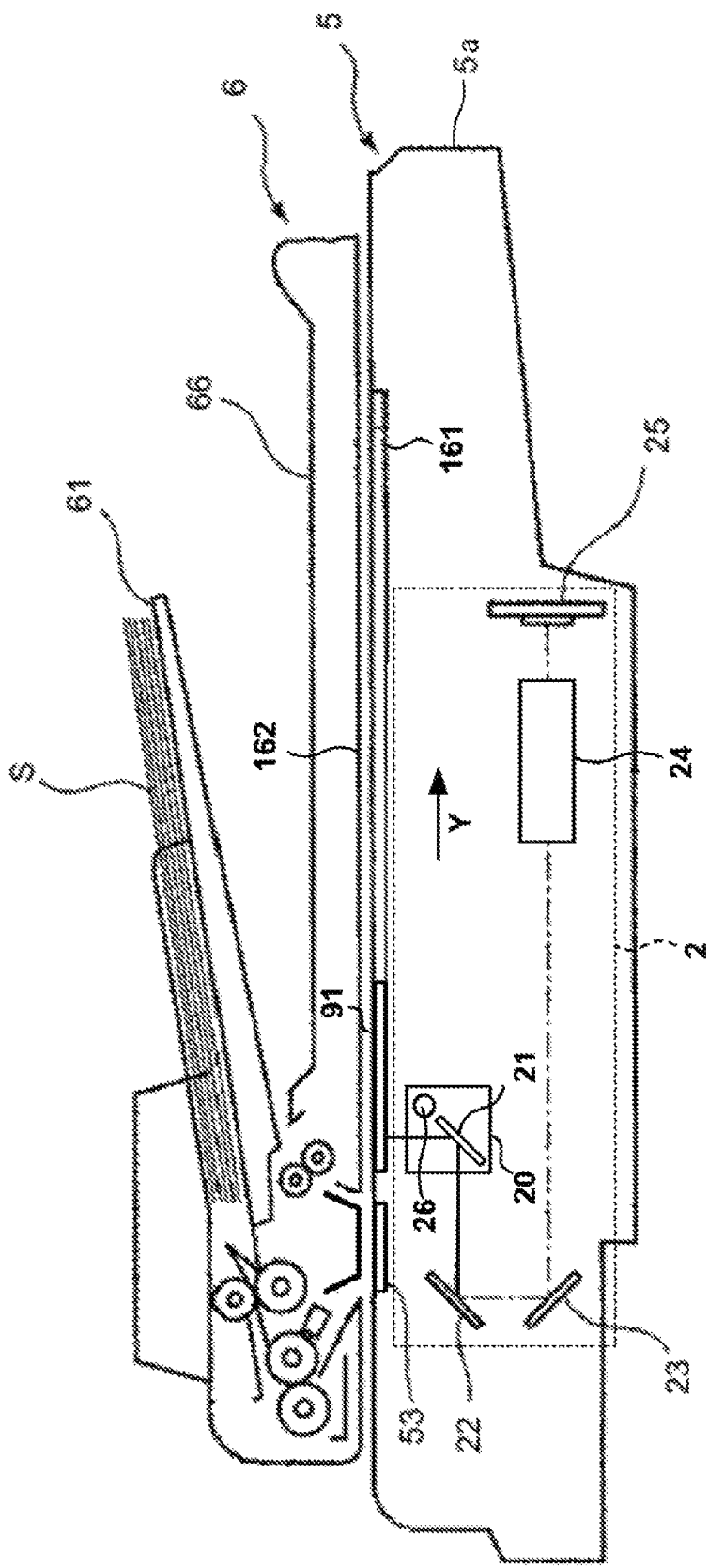
FIG. 2 is a schematic cross sectional view illustrating the image reading device according to an embodiment of the present disclosure.

FIG. 2 is a schematic cross sectional view illustrating an overall configuration of the image reading section 5. Note that the image reading section 5 includes a document conveyance section 6 (an auto document feeder (AFD)) as an example in the present embodiment.

The image reading section 5 includes a casing 5a, the contact glass 161 that is disposed at the upper surface of the casing 5a and on which an original document is to be placed, a scanning section 2, a document reading slit 53, and a white reference plate 91. The scanning section 2 includes a scanning unit 20. The scanning unit 20 includes a light source section 26 that irradiates an original document placed on the contact glass 161 with light, and a first mirror 21 that reflects light reflected by the original document to a second mirror 22. The scanning section 2 includes an image sensor 25 and a mirror group in addition to the scanning unit 20. The image sensor 25 includes image sensor elements such as charge coupled device (CCD) image sensors or complementary metal oxide semiconductor (CMOS) image sensors. The mirror group includes the second mirror 22, a third mirror 23, and a lens system 24 and guides the reflected light from the scanning unit 20 to the image sensor 25.

The light source section 26 includes a plurality of light sources (light emitting diodes (LEDs)) in a row in a main scanning direction of the scanning unit 20 (backward direction of the paper in FIG. 2). The light sources of the light source section 26 are disposed in a row in the main scanning direction that has a length greater than the length of the contact glass 161 in the main scanning direction. The scanning unit 20 reads an image of a part at a location opposite to the light sources in the main scanning direction in addition to a part of an image of the original document placed on the contact glass 161 using the row of the light sources and the image sensor 25 disposed correspondingly to the row of the light sources. The image sensor 25 will be described later.

The document conveyance section 6 feeds a document sheaf S loaded on a document loading section 61 on a sheet-by-sheet basis and conveys it to a position opposite to the document reading slit 53 by driving a paper feed roller and a conveyance roller so as to be read by the image reading section 5 through the document reading slit 53, and then ejects it to the document exit tray 66. The document conveyance section 6 includes a document pressing plate 162 that is openable and closable relative to the contact glass 161 disposed on the top of the image reading section 5. The document pressing plate 162 faces the upper surface of the image reading section 5 when the document conveyance section 6 is closed. The document pressing plate 162 presses the original document placed on the contact glass 161 and has a surface to press an original document that is usually white.

First, a user opens the document conveyance section 6, places an original document on the contact glass 161, and closes the document conveyance section 6. As a result, the original document is pressed against the contact glass 161. Upon an opening and closing detecting section 81 detecting opening and closing of the document conveyance section 6, a control section 100 recognizes that the original document is placed on the contact glass 161. The opening and closing detecting section 81 and the control section 100 will be described later.

The light source section 26 then emits light under control of the control section 100, so that the original document is irradiated with the light through the contact glass 161 from the light source section 26. The light reflected by the original document is then incident on the first mirror 21 through the contact glass 161. The incident light travels via the second mirror 22, the third mirror 23, and the lens system 24 and then is incident on the image sensor 25.

The image sensor 25 operates under control of the control section 100 to convert the incident light to electric signals. The image sensor 25 is disposed in the main scanning direction correspondingly to the aforementioned row of the light sources so that the image sensor 25 obtains output values for one line in the main scanning direction. Note that a plurality of image sensors 25 may be disposed in rows so as to simultaneously obtain image data of a plurality of lines corresponding to rows of the light sources.

The scanning unit 20 including the light source section 26 and the first mirror 21 moves at a constant speed in a sub-scanning direction (a direction indicated by an arrow Y) by a drive section 7, which will be described later. In the above configuration, the image reading section 5 obtains output values for one line of the original document in the main scanning direction successively in the sub-scanning direction, thereby reading an entire image of the original document.

Figure 3:
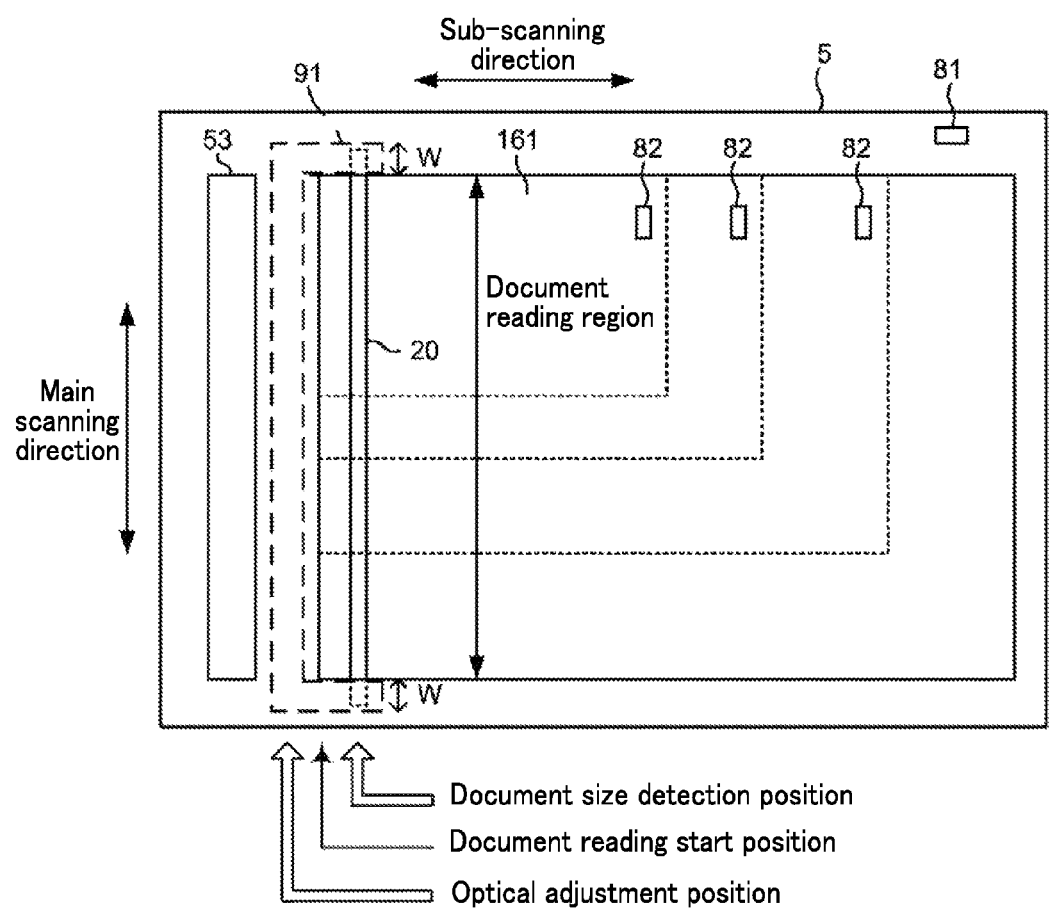
FIG. 3 is a schematic diagram view illustrating an image reading section of the image reading device as viewed from above according to an embodiment of the present disclosure.

FIG. 3 is a schematic diagram of the image reading section 5 as viewed from above. The opening and closing detecting section 81 detects opening and closing of the document conveyance section 6. Document size detectors 82 are a plurality of detectors (sensors) that each detect presence and absence of light reflected by a part of the contact glass 161 that is located opposite to corresponding one of the document size detectors 82 and outputs a detection result to the control section 100.

The white reference plate 91 is a plate having a predetermined color tone used for gain adjustment and shading correction, and is usually colored white. The white reference plate 91 has a rectangular portion (a first white reference plate) with a long side extending in the main scanning direction. The rectangular portion as the first white reference plate is disposed at a location outside a document reading region in the sub-scanning direction. The document reading region is a region in the contact glass 161 across which the scanning unit 20 perform reading. In the present embodiment, the long side of the rectangular portion as the first white reference plate has a length equal to or not less than a length of a region in the main scanning direction where the scanning section 2 can perform reading. That is, the rectangular portion as the first white reference plate has a length in the main scanning direction equal to or greater than a length of the row of the light sources of the light source section 26 that are disposed in the main scanning direction.

The white reference plate 91 has a shape in combination of the rectangular portion as the first white reference plate and white reference plate portions (second white reference plates) extending in the sub-scanning direction from opposite end parts of the rectangular portion in the main scanning direction (in opposite regions outside the contact glass 161 in the main scanning direction). That is, the first and second white reference plates are integral to constitute the white reference plate 91. Accordingly, the white reference plate 91 has a U-shape that opens downstream in the sub-scanning direction (rightward in the paper) when the image reading section 5 is viewed from above. The white reference plate 91 extends in the sub-scanning direction from an optical adjustment position to a document size detection position, both of which will be described later. That is, the white reference plate portions (the second white reference plates) extend in the sub-scanning direction from an end of the rectangular portion as the first white reference plate to or over the document size detection position in the sub-scanning direction. Further, the white reference plate portions (the second white reference plates) extending in the sub-scanning direction are disposed at a location where reading of the original document placed on the contact glass 161 is not obstructed in the main scanning direction.

Note that the white reference plate 91 is disposed within the casing 5a of the image reading section 5, and therefore, cannot be seen when the image reading section 5 is viewed from above. That is, the white reference plate 91 is attached and fixed to an upper inner surface of the casing 5a of the image reading section 5.

The optical adjustment position (a first position) is a position where the scanning unit 20 is located when optical adjustment including gain adjustment, offset adjustment, and shading correction sampling is performed on the image reading section 5 and that is located adjacent to a document reading start position in the sub-scanning direction. The rectangular portion as the first white reference plate of white reference plate 91 is disposed at the optical adjustment position (outside the document reading region in the contact glass 161 across which the scanning unit 20 performs reading). In optical adjustment, the drive section 7 moves the scanning unit 20 to the optical adjustment position and turns on the light source section 26. In this state, the scanning section 2 reads the surface of the white reference plate 91 (the rectangular portion as the first white reference plate). Based on a result of the reading, the optical adjustment section 101 performs optical adjustment, which will be described later.

Output values of the image sensor 25 as a result of image reading by the scanning unit 20 depends on ambient circumstances, change with time in device performance, etc., thereby resulting in variation in output values among the sensor elements of the image sensor 25 disposed in the main scanning direction. This variation may cause color irregularity in the main scanning direction in reading a white or black object, for example. In view of the foregoing, shading correction is performed. Shading correction is processing for correcting variation in output values among the sensor elements of the image sensor 25 through adjustment of an output value of each sensor to be in an appropriate range by gain adjustment and offset adjustment.

In shading correction, white data sampling is performed in a manner that the white reference plate 91 is read by the image sensor 25 to obtain a current output value of each of the sensor elements of the image sensor 25. Gain adjustment for correcting an amplification factor for image signals output from the image sensor 25 is then performed so that almost uniform white data as a whole in the main scanning direction is obtained from the sensor elements of the image sensor 25. Offset adjustment for correcting an amplification factor for image signals output from the image sensor 25 is further performed so that almost uniform black data as a whole in the main scanning direction is obtained from the sensors of the image sensor 25. Through the above processing, variation in output values in the image sensor 25 can be reduced in the main scanning direction. For example, when a white image (or a black image) is read, output values can be obtained from the image sensor 25 as uniform white data (or uniform black data in black image reading).

The optical adjustment is performed, for example, directly after power-up or recovery from the sleep state of the image reading section 5. Upon the opening and closing detecting section 81 detecting opening and closing of the document conveyance section 6 during optical adjustment, the drive section 7 moves the scanning unit 20 to the document size detection position located downstream of the optical adjustment position in the sub-scanning direction in the vicinity of the document reading start position.

The document size detection position (a second position) is located below the contact glass 161, that is, the document reading region in the sub-scanning direction. After the image reading section 5 is positioned at the document size detection position, determination as to whether or not a document is placed on the contact glass 161 can be performed.

A user moves the document pressing plate 162 upward to open the document conveyance section 6 in order to place a document on the contact glass 161 to let the opening and closing detecting section 81 detect the opened state of the document conveyance section 6. When the document is placed on the contact glass 161 in the above state, sensor elements of the image sensor 25 in the scanning unit 20 at a location corresponding to a part of the original document reading region where the document is absent output black data.

When the document conveyance section 6 is closed then, the opening and closing detecting section 81 detects the closed state. The document pressing plate 162 is white. As such, sensor elements of the image sensor 25 in the scanning unit 20 at a location corresponding to a part of the document reading region where the document is not placed accordingly output white data. In the above configuration, it is determined that the document is absent in a region of the contact glass 161 corresponding to a region where sensors of which outputs change from black data to white data in response to the document conveyance section 6 being changed from the opening state to the closed state are located.

Among the document size detectors 82, a document size detector 82 located in a region of the contact glass 161 on which an original document is placed outputs signals indicating the presence of paper while a document size detector 82 located in a region of the contact glass 161 on which the original document is not placed outputs signals indicating the absence of paper. The control section 100 calculates the size of the original document based on data from the scanning section 2 and detection results of the document size detectors 82. Acquisition of white and black data from the image sensor 25 of the scanning unit 20 and signals indicating the presence or absence of paper from the document size detectors 82 is triggered only by a state change of the document conveyance section 6 from the opened state to the closed state or from the closed state to the opened state. That is, the image reading section 5 is so set to perform document size detection upon occurrence of such a state change of the document conveyance section 6.

In the above configuration, when the document conveyance section 6 is opened during optical adjustment in a state in which the document conveyance section 6 is closed and the scanning unit 20 is positioned at the optical adjustment position (the first position), the drive section 7 moves the scanning unit 20 of the image reading section 5 to the document size detection position from the optical adjustment position.

Note that a white reference plate in an ordinary image forming apparatus is disposed at only the optical adjustment position. Therefore, the control section suspends optical adjustment in the aforementioned situation. The optical adjustment is re-performed after document size detection. As such, if the document conveyance section 6 is opened and closed again and again during optical adjustment in the ordinary image forming apparatus, optical adjustment is suspended and re-perform after document size detection each time the document conveyance section is opened and closed during optical adjustment. Therefore, it takes much time until preparation for a start of scanning in the scanning section is completed, thereby causing inconvenience.

In view of the foregoing, in the image reading section 5 according to the present embodiment of the present disclosure, the white reference plate 91 has a U-shape when viewed from above as illustrated in FIG. 3. The U-shape of the white reference plate 91 is such that, for example, the rectangular portion is disposed at the optical adjustment position, while the white reference plate portions extending in the sub-scanning direction are disposed between the optical adjustment position (the first position) and the document size detection position (the second position) outside the document reading region in the main scanning direction, that is, outside the contact glass 161 in the main scanning direction. In the above configuration in which the white reference plate 91 is disposed at a location above the opposite end parts of the scanning unit 20 in the main scanning direction, even during the time when or after the drive section 7 moves the scanning unit 20 from the optical adjustment position to the document size detection position, optical adjustment can be continued using light reflected by the white reference plate portions located above the opposite end parts.

Note that the aforementioned shape of the white reference plate 91 is an example. For example, the white reference plate 91 may be disposed not entirely in a range from the optical adjustment position to the document size detection position and be disposed at a location above both or one of the opposite end parts of the scanning unit 20 in the main scanning direction when the scanning unit 20 is positioned at the document size detection position.

Figure 4:
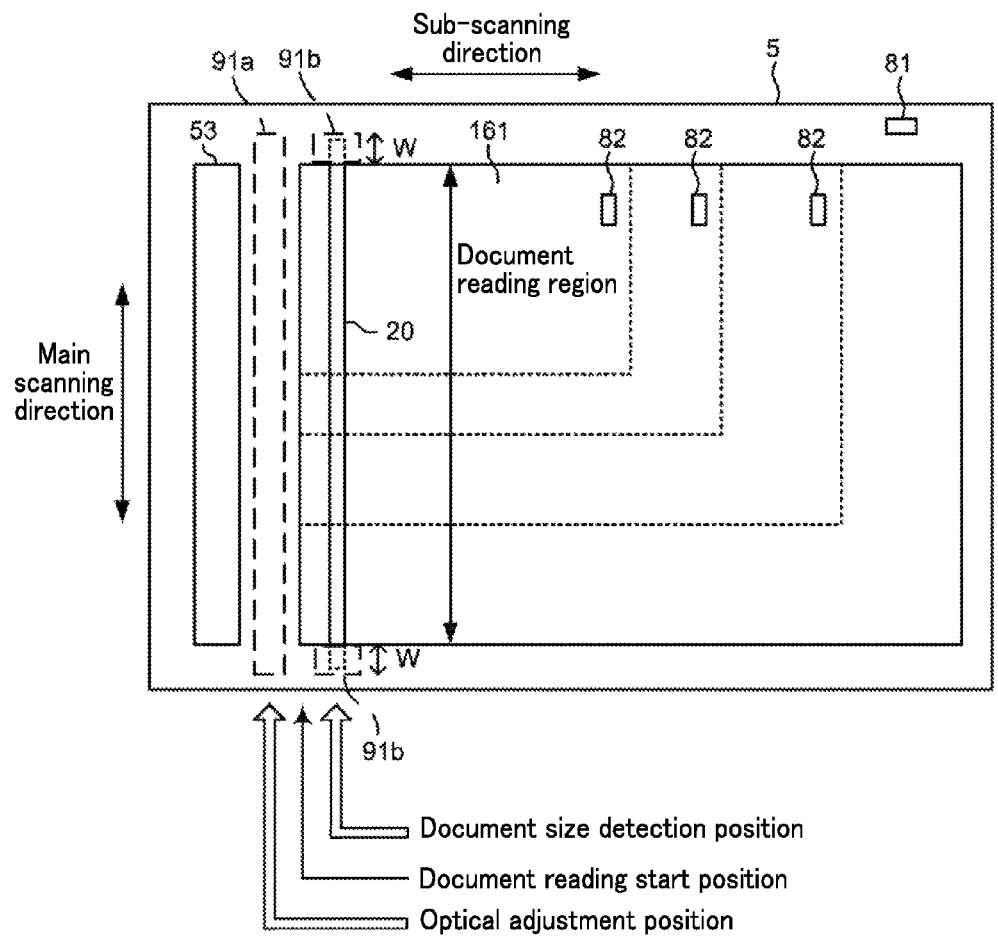
FIG. 4 is a schematic diagram illustrating another example of the image forming reading device as viewed from above according to another example of the embodiment of the present disclosure.

Another example is illustrated in FIG. 4. FIG. 4 is a schematic diagram of an image reading section 5 as viewed from above in another example. Referring to FIG. 3, the white reference plate 91 is in a U-shape. While, the white reference plate may be a combination of a white reference plate 91a (a first white reference plate) disposed at the optical adjustment position and white reference plates 91b (second white reference plates) disposed at the document size detection position in the sub-scanning direction outside the document reading region in the main scanning direction, as illustrated in FIG. 4. In short, the white reference plate 91a may be separate from the white reference plates 91b. The two white reference plates 91b are provided. The white reference plate 91a has a long side with a length equal to or greater than a length of the region in which the scanning section 2 perform reading in the main scanning direction. In the above configuration, sections in which no white reference plate is present lie between the optical adjustment position and the document size detection position. In the above configuration, the optical adjustment section 101 performs optical adjustment after the drive section 7 moves the scanning unit 20 to the document size detection position.

Note that the white reference plates are disposed at locations of the respective opposite end parts in the main scanning direction outside the document reading region in the main scanning direction at the document size detection position. However, only required is that a white reference plate is disposed at a location of at least one of the opposite end parts in the main scanning direction. In short, the white reference plate 91 is in a U-shape in FIG. 3 and may be in an L-shape. In this case, the first white reference plate and a second white reference plate are integral to constitute the white reference plate 91. In the case illustrated in FIG. 4, only required is to dispose either one of the two white reference plates 91b.

A mode in which optical adjustment is performed in a state in which the scanning unit 20 is positioned at the optical adjustment position is referred to as a first optical adjustment mode, while a mode in which optical adjustment is performed during the time when or after the scanning unit 20 is moved from the optical adjustment position to the document size detection position is referred to as a second optical adjustment mode.

Figure 5:
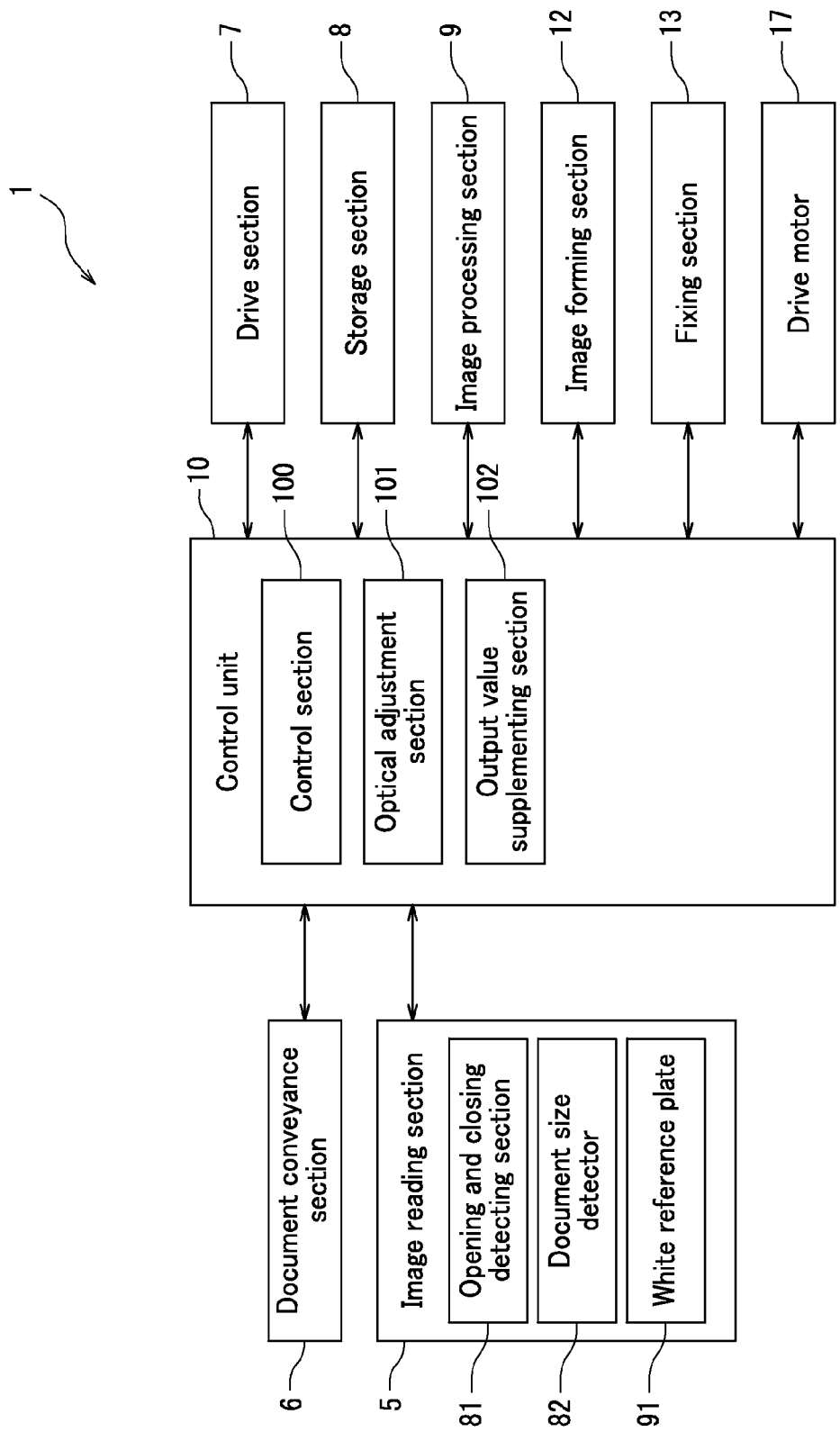
FIG. 5 is a block diagram illustrating an electric configuration of the image forming apparatus including the image reading section according to an embodiment of the present disclosure.

FIG. 5 is a block diagram illustrating an electric configuration of the image forming apparatus 1 including the image reading section 5 according to the present embodiment. Note that the same reference signs are assigned to the same elements as those described above and repeated description is omitted.

The drive section 7 moves the scanning unit 20 in the sub-scanning direction. The storage section 8 stores an image that the image reading section 5 obtains by a most recent reading in the first optical adjustment mode. The image processing section 9 performs image processing on an image read by the image reading section 5. Note that a drive motor 17 drives conveyance rollers 19, for example.

A control unit 10 includes a central processing unit (CPU) and the like, and executes processing in accordance with predetermined programs in response to an input instruction signal or the like to perform output of the instruction signal, data transfer, etc. among respective elements, thereby performing overall control on the image reading section 5 and the like. The control unit 10 in the present embodiment further includes the control section 100, the optical adjustment section 101, and an output value supplementing section 102.

The control section 100 governs overall operation control on the image forming apparatus 1. The control section 100 causes the scanning unit 20 to read the first white reference plate at the first position in optical adjustment by the optical adjustment section 101 and controls the scanning unit 20 to move from the first position to the second position for document size detection in response to the opening and closing detecting section 81 detecting opening and closing of the document conveyance section 6 (the document pressing plate 162) during the optical adjustment or reading.

The optical adjustment section 101 performs optical adjustment including shading correction such as gain adjustment, offset adjustment, shading correction sampling, etc. The above optical adjustment is adjustment on an optical system of the image reading section 5.

The output value supplementing section 102 will be described. When the optical adjustment section 101 performs optical adjustment in the second optical adjustment mode, an image that the scanning section 2 obtains includes an image of parts of the white reference plate 91 at a location outside the document reading region in the main scanning direction, that is, only an image of a region with a width W. However, it is desirable to perform optical adjustment on the entire document reading region in the main scanning direction. In view of the foregoing, the output value supplementing section 102 supplements output values for the document reading region in the main scanning direction using output values obtained by reading the region with the width W of the white reference plate 91 and the output values in the main scanning direction that are obtained by a most recent reading in the first optical adjustment mode and stored in the storage section 8.

Note that the image reading device in the appended claims includes the image reading section 5, the document conveyance section 6, the optical adjustment section 101, the output value supplementing section 102, the drive section 7, the storage section 8, the opening and closing detecting section 81, and the image processing section 9 in the present embodiment. However, it is only required that the image reading device includes at least the contact glass 161, the image reading section 5, the drive section 7, the document pressing plate 162, the opening and closing detecting section 81, the white reference plate 91a as the first white reference plate, one of the white reference plates 91b as the second white reference plate, and the optical adjustment section 101.

Figure 6:
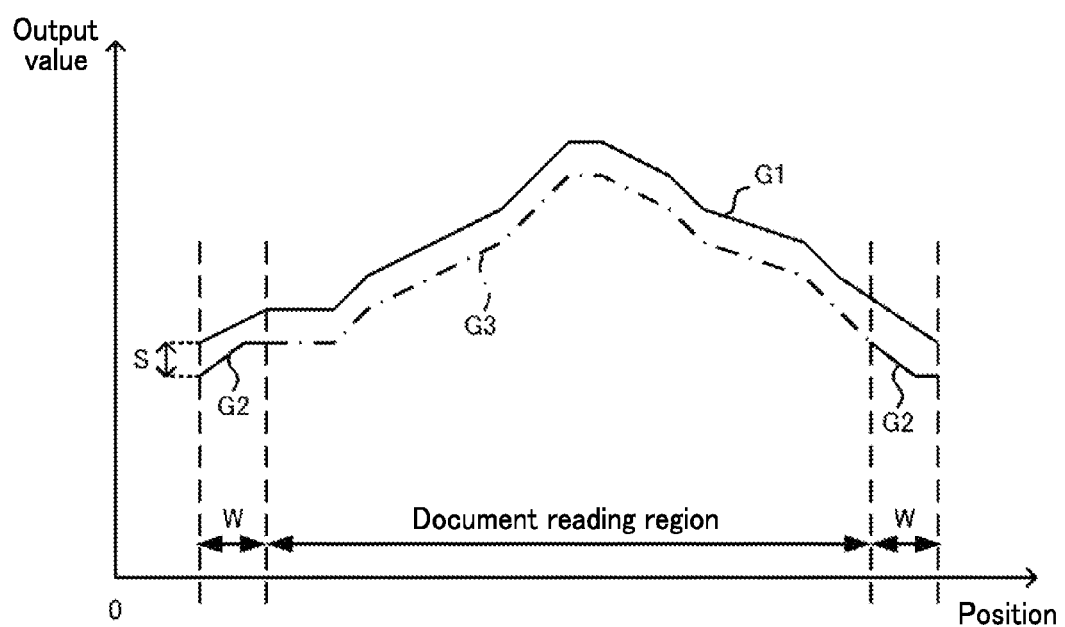
FIG. 6 is a graph representation indicating examples of output values obtained in gain adjustment according to an embodiment of the present disclosure.

A supplementing method will be described. FIG. 6 is a graph representation indicating examples of output values obtained in gain adjustment. The vertical axis indicates output values of the respective sensor elements of the image sensor 25, while the horizontal axis indicates the positions of the respective sensor elements of the image sensor 25. A graph G1 represents the output values obtained in the first optical adjustment mode. A graph G2 represents the output values obtained in the second optical adjustment mode.

The optical adjustment is frequently performed during operation of the image reading section 5. Current output values accordingly vary not so much from the most recent output values. The output value supplementing section 102 calculates an amount of change in output values corresponding to the region with the width W by comparing the output values (G2) read in the second optical adjustment mode and the output values (G1) that are obtained by a most recent reading in the first optical adjustment mode and stored in the storage section 8. The output value supplementing section 102 then applies the amount of change obtained as above to output values corresponding to the document reading region among the output values obtained by the most recent reading in the first optical adjustment mode. The output values to which the amount of change is applied are regarded as current output values.

Specifically, where it is supposed that S represents an amount of change in the output values obtained in the second optical adjustment mode relative to the latest output values stored in the storage section 8, the output value supplementing section 102 supplements values obtained by subtracting the amount of change S from output values corresponding to the document reading region represented by the graph G1 as current output values G3 corresponding to the document reading region. The output value supplementing section 102 performs output value supplement also in shading correction in the same manner. After supplement of the output values for the document reading region in the above manner, the optical adjustment section 101 obtains a gain coefficient and a shading correction coefficient. Note that offset adjustment is performed in a state in which the light source section 26 is turned off, and therefore, does not need the above supplement.

Figure 7:
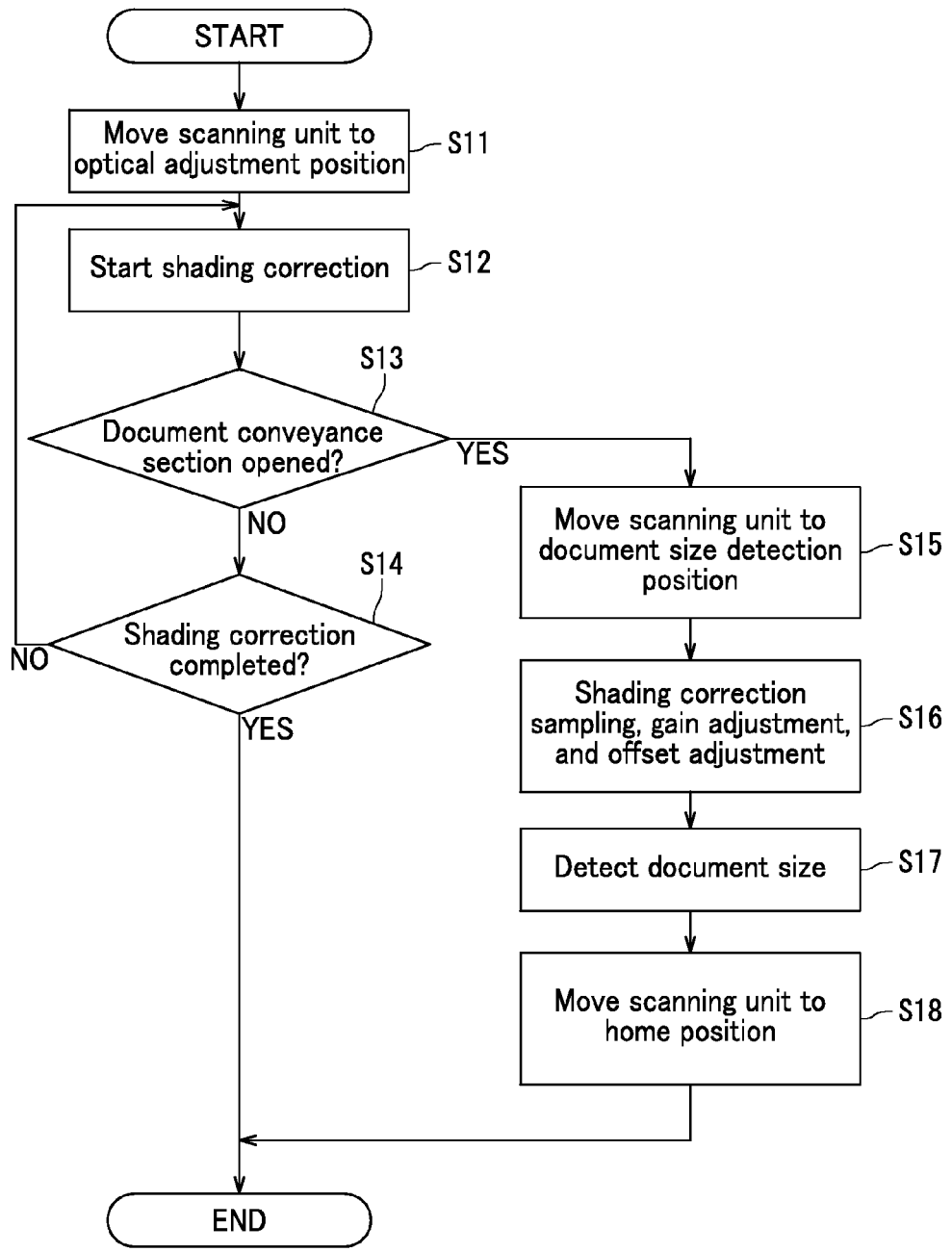
FIG. 7 is a flowchart depicting a process of optical adjustment according to an embodiment of the present disclosure.

FIG. 7 is a flowchart depicting a process of optical adjustment according to the present embodiment. Note that respective processes of gain adjustment, offset adjustment, and shading correction are described in the order in the present embodiment. However, shading correction may be performed independently. In this case, the optical adjustment may include only gain adjustment and offset adjustment.

Directly after power-up or recovery from the sleep state of the image reading section 5, the optical adjustment section 101 performs shading correction (optical adjustment). First, the optical adjustment section 101 causes the drive section 7 to move the scanning unit 20 to the optical adjustment position (Step S11), and starts shading correction (optical adjustment) including gain adjustment and offset adjustment. The shading correction is performed in a manner that the optical adjustment section 101 causes the scanning unit 20 of the image reading section 5 to read the white reference plate 91 while turning on the light source section 26 and then to read the white reference plate 91 while turning off the light source section 26 for shading correction sampling and the optical adjustment section compares white and black data obtained by the reading with white and black reference values, respectively (Step S12).

Upon the opening and closing detecting section 81 detecting opening and closing of the document conveyance section 6 during the shading correction (YES at Step S13), the optical adjustment section 101 causes the drive section 7 to move the scanning unit 20 to the document size detection position (Step S15). After the scanning unit 20 is moved to the document size detection position, the optical adjustment section 101 causes the scanning unit 20 to perform shading correction sampling to continue gain adjustment and offset adjustment (Step S16). In a case in which the white reference plate 91 has a U-shape as described above, the optical adjustment section 101 causes the scanning unit 20 to perform shading correction sampling to continue gain adjustment and offset adjustment even during the time when the scanning unit 20 is moved to the document size detection position. Note that it is preferable that the output value supplementing section 102 supplements output values for the document reading region as described above for white data that is an image that the scanning section 2 obtains by reading the white reference plate 91 for shading correction sampling performed in that time.

Thereafter, the control section 100 performs document size detection using output values of the scanning section 2 and detection results the document size detectors 82 (Step S17). If necessary, the optical adjustment section 101 may perform shading correction in parallel to this process. After document size detection and shading correction, the control section 100 causes the drive section 7 to move the scanning unit 20 to the document reading start position (a home position) (Step S18). The document reading start position is set between the optical adjustment position and the document size detection position in the sub-scanning direction, for example, as illustrated in FIGS. 3 and 4.

By contrast, when the opening and closing detecting section 81 detects neither opening nor closing of the document conveyance section 6 during shading correction (NO at Step S13) and shading correction is completed (YES at Step S14), optical adjustment is ended.

As has been described so far, the white reference plate 91 is disposed at not only the optical adjustment position but also a location readable by the scanning section 2 at the document size detection position. In the above configuration, even in a situation in which the scanning unit 20 is moved to the document size detection position to start document size detection in responses to the opening and closing detecting section 81 detecting opening and closing of the document conveyance section 6, which may be carried out for placement or replacement of an original document on the contact glass 161, optical adjustment can be performed continuously after the scanning unit 20 is moved to the document size detection position. Further, in a case in which the white reference plate 91 is disposed at a location between the optical adjustment position and the document size detection position outside the document reading region in the main scanning direction, shading correction sampling can be performed even during movement of the scanning unit 20 toward the document size detection position.

In the above configuration, document size detection can be performed simultaneously with optical adjustment such as shading correction. The optical adjustment section can accordingly perform optical adjustment without interruption in parallel to document size detection. As a result, elongation of time necessary for preparation of a start of scanning can be prevented, thereby increasing user convenience.

Furthermore, it is noted that when optical adjustment is performed in the second optical adjustment mode, the output value supplementing section 102 supplements output values for the document reading region. In the above configuration, optical adjustment can be performed using an image of which quality is approximated to an image obtained by reading the white reference plate 91 in the first optical adjustment mode even when an image (white data) of only a part of the white reference plate 91 in the main scanning direction is obtained in the second optical adjustment mode.

Note that in the present disclosure, the second white reference plate is disposed in a readable region at the second position in addition to the first white reference plate disposed at the first position. In the above configuration, even when the drive section moves the scanning unit from the first position to the second position in response to the opening and closing detecting section detecting opening and closing of the document pressing section during optical adjustment, the scanning section can read an image of the white reference plate for optical adjustment. Accordingly, the optical adjustment section can perform optical adjustment without interruption, with a result that elongation of time for preparation of a start of scanning can be prevented and user convenience is increased.

What is claimed is:

1. An image reading device comprising:
   contact glass configured to receive placement of an original document;
   a casing that accommodates the contact glass;
   a scanning section accommodated in the casing and including a scanning unit including a plurality of light sources in a row in a main scanning direction that has a length greater than a length of the contact glass in the main scanning direction, the scanning section being configured to read an image of a part at a location opposite to the light sources in the main scanning direction, the image including an image of a part of an original document placed on the contact glass;
   a drive section configured to move the scanning unit in a sub-scanning direction perpendicular to the main scanning direction;
   a document pressing plate configured to be capable of opening and closing relative to the contact glass and press the original document placed on the contact glass against the contact glass when closed;
   an opening and closing detecting section configured to detect opening and closing of the document pressing plate;
   a first white reference plate disposed at a location that is outside a document reading region in the sub-scanning direction and that is readable when the scanner unit is positioned at a first position adjacent to a document reading start position, the first white reference plate having a length in the main scanning direction equal to or greater than a length of the row of the light sources in the main scanning direction, the document reading region being a region in the contact glass across which the scanning unit performs reading;
   a second white reference plate disposed at a location that is readable when the scanner unit is positioned at a second position and where reading of the original document placed on the contact glass is not obstructed in the main scanning direction, the second position being a position that is within the document reading region in the sub-scanning direction and where the scanning unit is positioned in detection of a size of the original document placed on the contact glass;
   an optical adjustment section configured to perform optical adjustment on the scanning section using an output value that the scanning section obtains by reading the first white reference plate; and
   a control section that is configured to cause the scanning section to read the first white reference plate when the scanning unit is positioned at the first position for optical adjustment by the optical adjustment section, and cause the scanning unit to move from the first position to the second position for detection of a size of the original document in response to the opening and closing detecting section detecting opening and closing of the document pressing plate in the optical adjustment or reading, wherein
   in a state in which the scanning unit is positioned at the first position, the optical adjustment section performs optical adjustment using an image of the first white reference plate that the scanning section reads while in the state, and
   after the scanning unit is moved to the second position, the optical adjustment section performs optical adjustment using an image of the second white reference plate that the scanning section reads in a state in which the scanning unit is positioned at the second position.

2. The image reading device according to claim 1, wherein
   the second white reference plate includes two second white reference plates disposed at respective opposite end parts on an upper inner surface of the casing, each of the opposite end parts being located outside the contact glass in the main scanning direction at the second position.

3. The image reading device according to claim 2, wherein the second white reference plate is disposed in a region between the first position and the second position, the region being located outside the contact glass in the main scanning direction on the upper inner surface of the casing.

4. The image reading device according to claim 2, wherein
the first white reference plate and the second white reference plate are integral to constitute a white reference plate, and
the white reference plate has a U-shape.

5. The image reading device according to claim 2, wherein
the first white reference plate and the second white reference plate are separate from each other, and
the second white reference plate includes two second white reference plates.

6. The image reading device according to claim 2, further comprising:
a storage section configured to store output values that the image reading section obtains by a most recent reading of the first white reference plate; and
an output value supplementing section configured to supplement after reading of the second white reference plate by the image reading section, output values for the document reading region using output values obtained by the reading and the output values stored in the storage section, wherein
the optical adjustment section performs optical adjustment after the output value supplementing section supplements the output values for the document reading region using the output values obtained by the reading of the second white reference plate.

7. An image forming apparatus comprising:
the image reading device according to claim 6; and
an image forming section configured to print an image read by the image reading device on paper.

8. The image reading device according to claim 1, wherein
the second white reference plate is disposed at either one of opposite end parts on an upper inner surface of the casing, the either one of the opposite end parts being located outside the contact glass in the main scanning direction at the second position.

9. The image reading device according to claim 8, wherein
the second white reference plate is disposed in a region between the first position and the second position, the region being located outside the contact glass in the main scanning direction on the upper inner surface of the casing.

10. The image reading device according to claim 8, wherein
the first white reference plate and the second white reference plate are integral to constitute a white reference plate, and
the white reference plate has an L-shape.

11. The image reading device according to claim 8, wherein
the first white reference plate and the second white reference plate are separate from each other, and
the second white reference plate is a single second white reference plate.

12. The image reading device according to claim 8, further comprising:
a storage section configured to store output values that the image reading section obtains by a most recent reading of the first white reference plate; and
an output value supplementing section configured to supplement after reading of the second white reference plate by the image reading section, output values for the document reading region using output values obtained by the reading and the output values stored in the storage section, wherein
the optical adjustment section performs optical adjustment after the output value supplementing section supplements the output values for the document reading region using the output values obtained by the reading of the second white reference plate.

13. An image forming apparatus comprising:
the image reading device according to claim 12; and
an image forming section configured to print an image read by the image reading device on paper.

14. The image reading device according to claim 1, wherein
the second white reference plate is disposed in a region between the first position and the second position, the region being located outside the contact glass in the main scanning direction on an upper inner surface of the casing.

15. The image reading device according to claim 1, further comprising:
a storage section configured to store output values that the image reading section obtains by a most recent reading of the first white reference plate; and
an output value supplementing section configured to supplement after reading of the second white reference plate by the image reading section, output values for the document reading region using output values obtained by the reading and the output values stored in the storage section, wherein
the optical adjustment section performs optical adjustment after the output value supplementing section supplements the output values for the document reading region using the output values obtained by the reading of the second white reference plate.

16. An image forming apparatus comprising:
an image reading device according to claim 15; and
an image forming section configured to print an image read by the image reading device on paper.

17. An image forming apparatus comprising:
the image reading device according to claim 1; and
an image forming section configured to print an image read by the image reading device on paper.

* * * * *